Jan. 3, 1961     D. J. SCHWENDNER     2,967,065
VEHICLE AIR SUSPENSION SYSTEM CONTROL VALVE MEANS
Filed Dec. 9, 1957     3 Sheets-Sheet 1

D. J. SCHWENDNER
INVENTOR.

BY E. C. McRae
J. L. Faulkner
T. H. Oster

ATTORNEYS

United States Patent Office 2,967,065
Patented Jan. 3, 1961

2,967,065

VEHICLE AIR SUSPENSION SYSTEM CONTROL VALVE MEANS

Donald J. Schwendner, Livonia, Mich., assignor to Ford Motor Company, Dearborn, Mich., a corporation of Delaware Filed Dec. 9, 1957, Ser. No. 701,574

1 Claim. (Cl. 280—124)

This invention relates to an air suspension system used on motor vehicles and the like. In particular, it involves a novel arrangement of a control valve used in the single conduit between the leveling valve and the air spring to keep the pressure in the air spring from going below a predetermined value and to prevent shock loading damage by venting the valve to atmosphere.

A continuous type leveling system is illustrated in the drawings in which a leveling valve is positioned between the positive air supply and the air spring to permit air to enter or leave the air spring through a single conduit between the air spring and the leveling valve. Linkage means connected to the motor vehicle chassis actuate the leveling valve to vary the volume of air in the air spring.

Under certain circumstances such as cornering, jacking up of the body, and dropping of a wheel in a hole, the adjusting linkage actuates the leveling valve to the exhaust position in an attempt to bring the body into the trim height position. Because of the nature of the temporary condition, air is exhausted until an atmospheric condition is reached in the air bag or until the temporary condition is terminated. If the air bag has reached atmospheric pressure, and the vehicle temporary condition is subsequently terminated, the car is out of trim and may be difficult to handle until the body trim height is regained. Other factors, such as an inoperative leveling valve intake valve, may prevent air from entering the air spring, yet permit the air to be exhausted; or the exhaust valve may To avoid the excessive dumping of air out of the air spring, the applicant has provided a pressure responsive valve which is connected to the single conduit between the air spring and the leveling valve. The valve is provided with a spring which biases a plunger when the pressure on either side of the plunger has reached a predetermined value and cuts off the air spring from the leveling valve. A sufficient surface is provided on the plunger so that when the air pressure exceeds the predetermined value of spring, the plunger will be biased outwardly to open the conduit. This valve works in both the intake and the exhaust condition of the system. Air does not go through the operative portion of the valve itself but between the plunger and the conduit thereby providing, when sufficient pressure exists, a clear and unobstructed passage. When severe shock loading is encountered, a vent hole in the valve body communicating with the passage and atmosphere is uncovered by the spring being fully compressed by the excessive air pressure on the plunger permitting an exhaust to atmosphere. The pressure responsive valve works independently of the leveling valve and is not mechanically actuated, and is operative regardless of the air direction.

Other objects and advantages of the present invention will become more apparent as this description proceeds, particularly when considered in connection with the accompanying drawings, in which.

Figure 1:
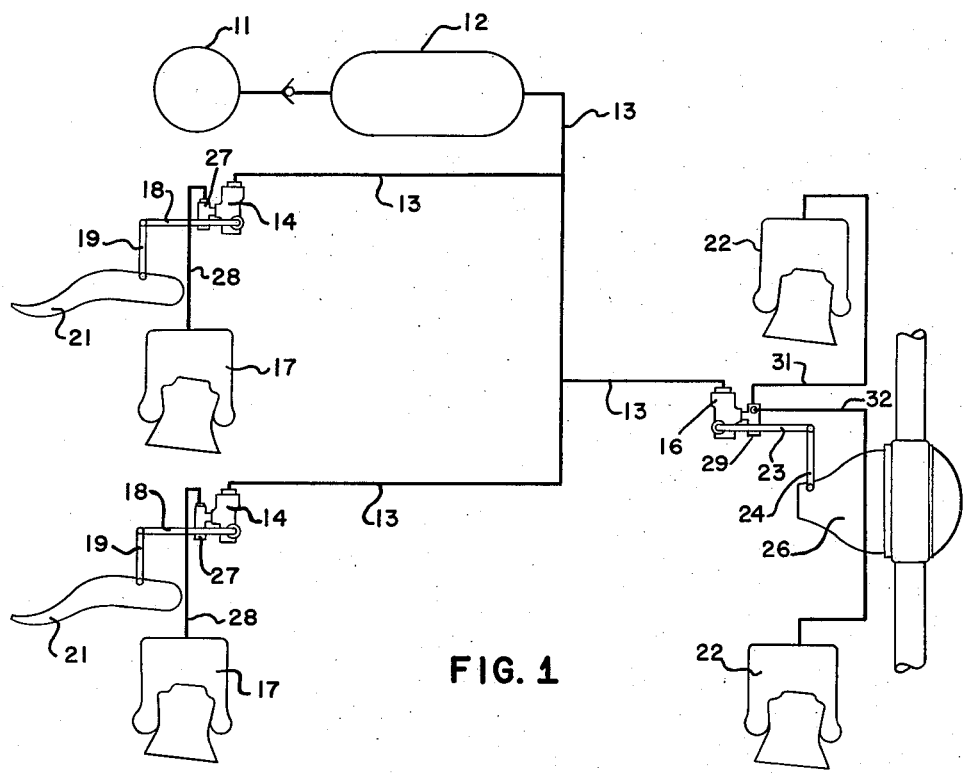
Figure 1 is a diagrammatic view of an air suspension system embodying the present invention.

Referring now to the drawings, a compressor is generally indicated at 11 which supplies air under pressure for storage in a reservoir tank 12 which in turn feeds this air through conduits 13 to front and rear leveling valves 14 and 16, and ultimately, if required to front and rear air springs 17 and 22 respectively. The front leveling valves 14 are actuated by linkage control members 18 and 19 connected to suspension member 21 located on the front of the vehicle. The rear air springs 22 are controlled by leveling valve 16 through links 23 and 24 which are connected to the differential 26. The front leveling valves 14 are connected to the air springs by conduits 28 and have interposed between them the respective control valves indicated at 27. In the rear leveling arrangement, the rear air springs 22 are connected by feed conduits 31 and 32 respectively, to the automatic control valve 29 which in turn is connected to the rear leveling valve 16. It is to be noted that the automatic control valves 27 and 29 are respectively disposed between the leveling valves 14 and 16 and the air springs 17 and 22. In conduits 13, the air is unidirectional from the reservoir 12 to the respective leveling valves, while in conduits 28, 31 and 32 the air is bidirectional in that it travels in one direction during intake and in the opposite direction during exhaust. Valve 14 is provided with an inlet port 34 and an outlet port 35. Dependent upon the positioning of the plunger 42 which is actuated by a cam 43 connected to shaft 44 and moved by the linkage members 18 and 19, either one of the ports 34 and 35 may be open to the control valve port 36. In the intake portion, incoming air goes through the filtered inlet port 34 and moves the conical shaped inlet valve 37 downwardly compressing spring 39. Spring 39 is supported at the other end on movable valve disc 41 which is manually moved upwardly by the plunger 42, against its spring 47, to permit air to enter the passage 36.

In the exhaust condition, the valve plunger 42 is moved downwardly against the spring and the valve disc 41 rests on shoulders provided in the housing 33 closing off the intake passage to the air spring. Plunger 42 is moved downwardly beyond the shoulders in the housing 33 permitting the air coming from the air spring through the passage 36 to be released through an exhaust passage 46 in the plunger and out through the exhaust port 35. It is to be noted that the air travel in the exhaust passage 46 is uni-directional.

Referring now to the automatic control valve 27, a cylindrical housing 48 is provided with an interior passage 49 through which the air passes. Valve 27 may be connected to the conduit 28 at any convenient position between the air spring and the leveling valve. A piston 51, having a resilient head 53 is normally urged to close off the passage 49 by spring means 54 having a predetermined spring rate value. The spring may be adjusted to the proper spring rate by virtue of the threaded cap 56 threadably engaging the sides of the housing 48. O-ring 63, made from an elastomer material, provides a seal between the piston 51 and the interior surface of the valve housing.

Figure 4:
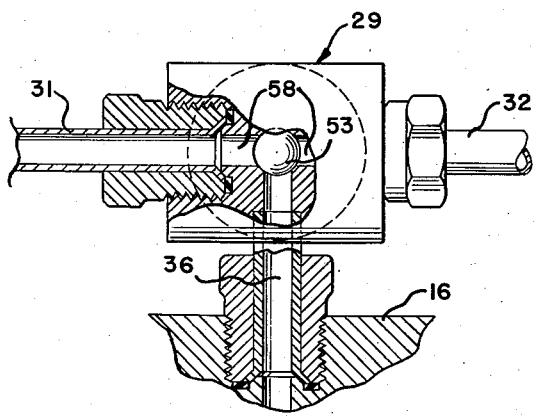
Figure 4 is a plan view partly in section of the control valve shown in Figure 3; and, Figure 5 is a cross sectional view of a control valve similar to that shown in Figure 2 and embodying a safety air release.
Figure 2:
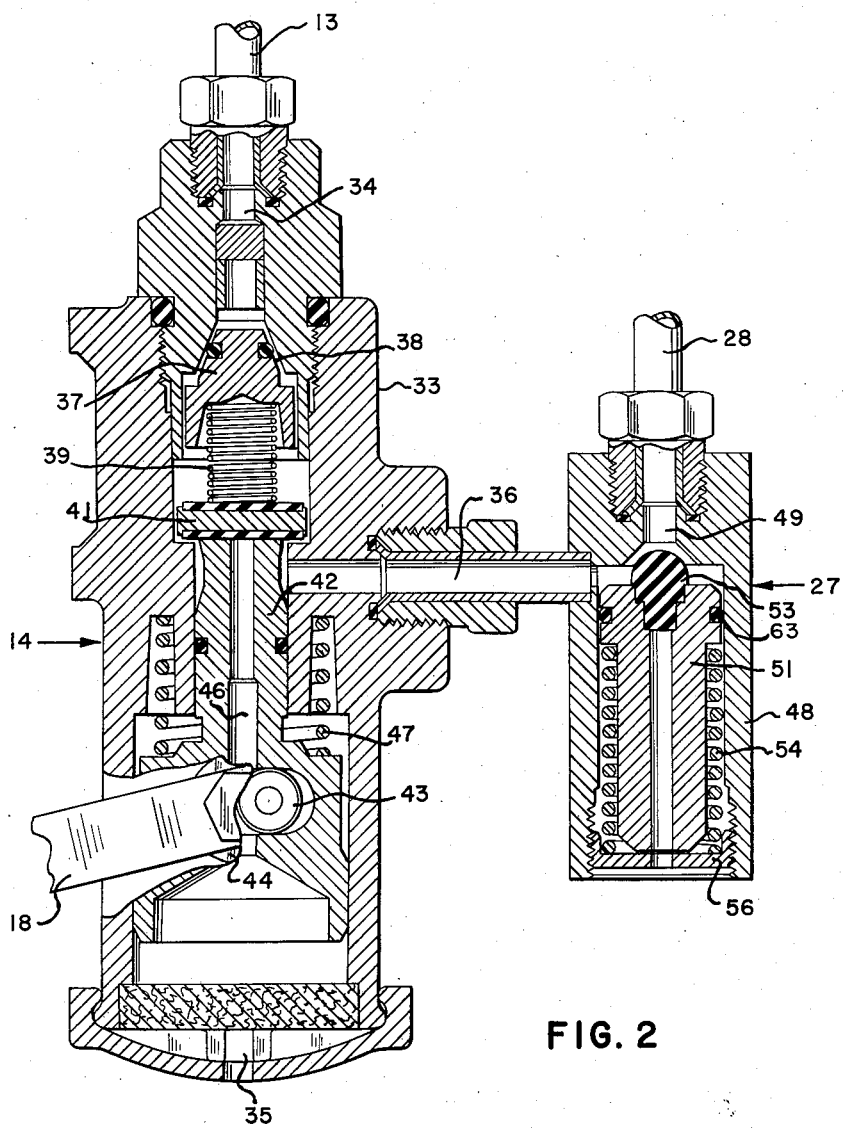
Figure 2 is an enlarged cross sectional view of the automatic control valve connected to one of the leveling valves.
Figure 3:
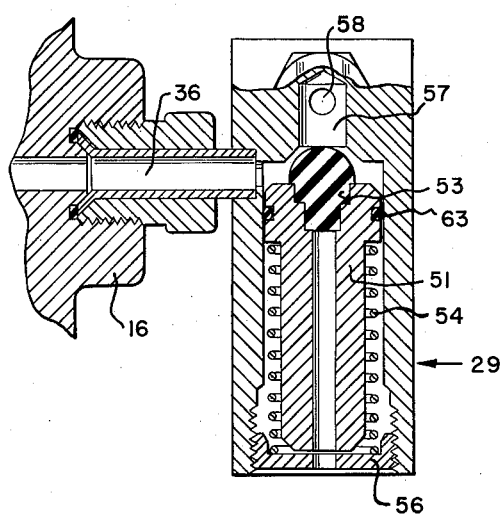
Figure 3 is an enlarged cross sectional view of the automatic control valve used to control a pair of air springs.

Referring now to Figures 3 and 4, the control valve 29 is shown for controlling the interconnected rear air springs 22. In the embodiment used for the interconnected air springs, there is provided the usual opening 57 through which the air passes to and from the air spring. Passage 57, however, is provided with a pair of oppositely directed passages 58 communicating with the conduits 31 and 32 respectively. The piston 51 and the other parts are common with the arrangement used with the front leveling valve 27. Piston 51 controls the passage 57 thereby controlling the intake and exhaust of air from the interconnected rear air springs 22. The control valve 29, like the control valves 14 which are used in the front air spring arrangement, is connected to the bi-directional air conduits 31 and 32, and is operative by the air pressure from either direction.

Figure 5:
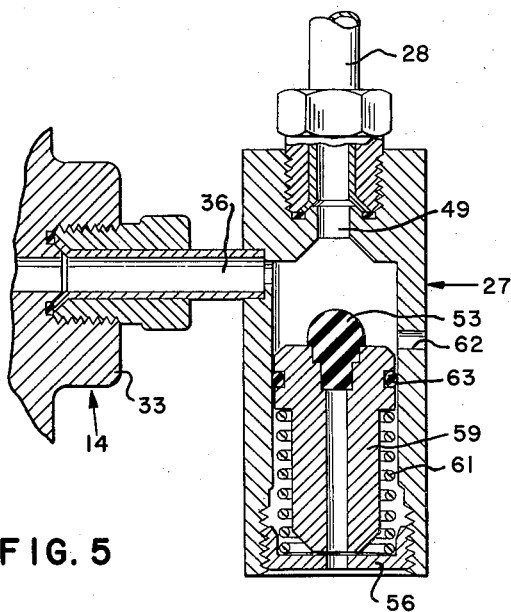

The venting of the valve, in the event of severe shock loading in the system is shown in Figure 5. A shorter piston 59 is provided so that when it is moved to its outmost position under severe shock loading, it reveals a vent hole 62 in the side of the housing. Vent 62 permits communication between the passage 57 and atmosphere when the piston is in this outermost position, which is reached when the air pressure substantially exceeds the spring rate of the spring 61.

It is to be noted that in the embodiment of the control valves 27 and 29, the passages between the leveling valve and the air spring are unrestricted and open when the pressure exceeds the predetermined spring rate value of the springs 54 and 61 on either side of the piston head 53.

The operation of the valves 27 and 29 is the same. If the air spring pressure drops below the value of the spring 54 either as a result of the volume of the air spring being increased without the loss of air or as a result of the loss of air through the action of the leveling valve adjusting the vehicle trim, spring 54 will urge the piston upwardly so that the piston head 53 will seal the passage through the valve and seal off the air spring from the leveling valve. Upon the return of the vehicle to its prior position, air spring pressure will force the piston downwardly and/or the leveling valve may require the introduction of air into the air spring to change the vehicle trim. Because the intake air received from the reserve tank (or compressor) is of greater pressure than the value of spring 54, the piston will move downwardly permitting the air to go into the air spring. Piston 51 will then remain in the open position until the air pressure again falls below the value of the spring 54.

It will be understood that the invention is not to be limited to the exact construction shown and described, but that various changes and modifications, including the use of various control valve desgins, may be made without departing from the spirit and scope of the invention, as defined in the appended claim.

What is claimed is:

An air pressure control arrangement for a motor vehicle air suspension system comprising a positive air supply, an air spring, a leveling valve, conduit means including a first conduit connecting the positive air supply to the leveling valve for the unidirectional movement of air from the air supply to the leveling valve, a second conduit connecting the leveling valve to the air spring for a bi-directional movement of air, one direction being in the intake condition of the leveling valve with the air moving from the leveling valve to the air spring, and the second direction being in the exhaust condition of the leveling valve with the air moving from the air spring to the leveling valve, a third conduit connecting the leveling valve to the exhaust for the unidirectional movement of air from the leveling valve to exhaust, a control valve connected to the second conduit, means responsive to height variations in the vehicle suspension system for selectively actuating said leveling valve to admit air into the air spring and to exhaust air from the air spring, a pressure responsive member connected to said second conduit and having a housing with a passage open to the second conduit for the bi-directional movement of air from the leveling valve to the air spring and from the air spring to the leveling valve, a plunger movable in said housing to open and close said passage, a spring disposed between a portion of the inside of the housing and the plunger having a predetermined value and urging the plunger to move to block said passage, the air pressure in the second conduit normally maintaining the piston in an unblocked position of the passage against the action of said spring until the air pressure in the second conduit has fallen to the value of the spring whereupon said spring will urge the plunger to block the passage and seal the air spring from the leveling valve.

References Cited in the file of this patent

UNITED STATES PATENTS

| | | |
|---|---|---|
| 1,260,487 | Vincent | Mar. 26, 1918 |
| 1,555,199 | Gouirand | Sept. 29, 1925 |
| 2,104,390 | Murphy | Jan. 4, 1938 |
| 2,591,641 | Troendle | Apr. 1, 1952 |
| 2,787,475 | Jackson | Apr. 2, 1957 |
| 2,809,051 | Jackson | Oct. 8, 1957 |